Figure 1:
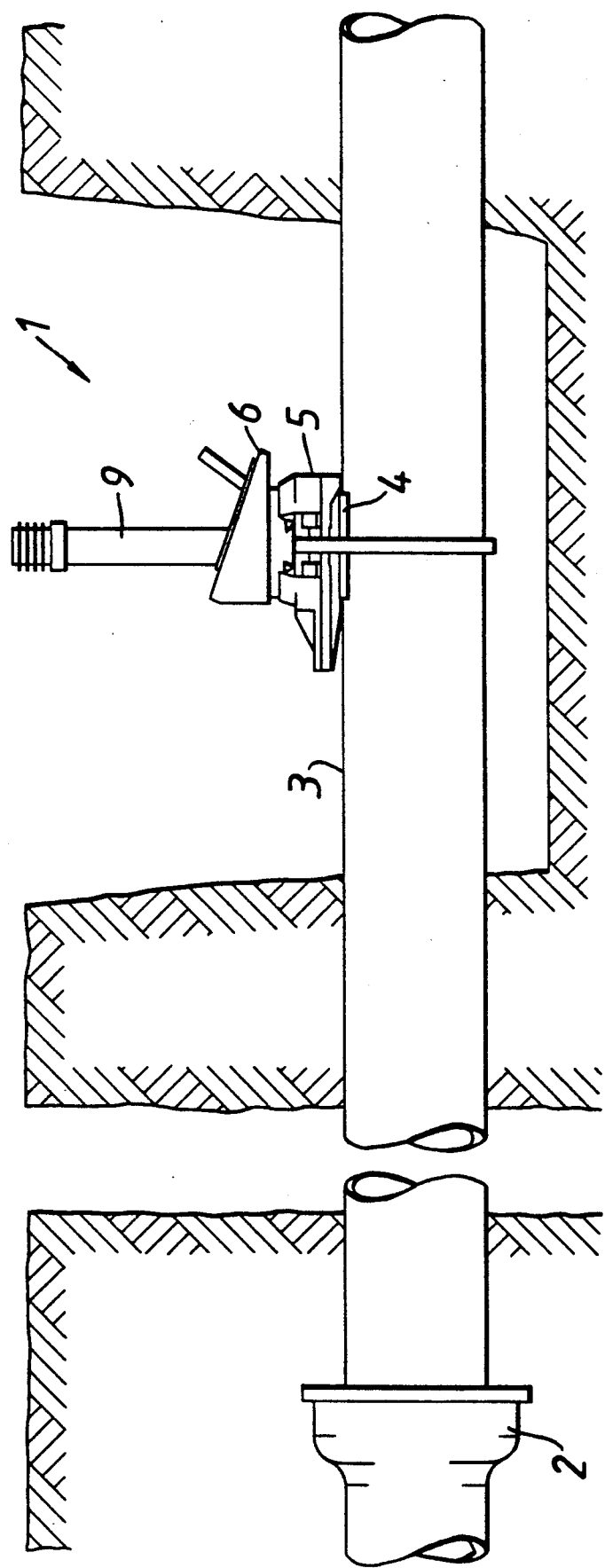

United States Patent [19]
Kitson

[11] Patent Number: 5,156,886
[45] Date of Patent: Oct. 20, 1992

[54] METHOD OF SEALING A DISCONTINUITY WITHIN A GAS MAIN

[75] Inventor: Clive M. Kitson, Surrey, England

[73] Assignee: British Gas plc, London, England

[21] Appl. No.: 426,811

[22] Filed: Sep. 29, 1989

[30] Foreign Application Priority Data

Oct. 4, 1988 [GB] United Kingdom ............... 8823240

[51] Int. Cl.$^5$ .................... B32B 35/00; B05D 7/22
[52] U.S. Cl. ................... 427/140; 427/142; 427/226; 427/239
[58] Field of Search ............. 427/140, 142, 236, 239, 427/238, 292, 290; 118/317

[56] References Cited

U.S. PATENT DOCUMENTS

| | | | |
|---|---|---|---|
| 4,022,935 | 5/1972 | Kinney et al. | 427/140 |
| 4,419,163 | 12/1983 | Yamamoto et al. | 427/140 |
| 4,556,580 | 12/1985 | Kamuro et al. | 427/238 |
| 4,678,449 | 6/1987 | Webb et al. | 427/140 |
| 4,731,982 | 3/1988 | Grant et al. | 156/94 |
| 4,758,295 | 7/1988 | Savaikla et al. | 421/140 |
| 4,768,561 | 9/1988 | Hyodo et al. | 138/97 |

FOREIGN PATENT DOCUMENTS

| | | |
|---|---|---|
| 283192 | 9/1988 | European Pat. Off. |
| 1482200 | 8/1977 | United Kingdom |
| 2159906 | 12/1985 | United Kingdom |
| 2174776 | 11/1986 | United Kingdom |
| 2182745 | 5/1987 | United Kingdom |
| 2195416 | 4/1988 | United Kingdom |
| 2198208 | 6/1988 | United Kingdom |
| 2199386 | 7/1988 | United Kingdom |

*Primary Examiner*—Janyce Bell
*Attorney, Agent, or Firm*—Oblon, Spivak, McClelland, Maier & Neustadt

[57] ABSTRACT

A method of sealing a joint in a gas main comprising boring a hole in the wall of the main at a point spaced from the joint, inserting into the main through the hole so formed a sealant spraying means, moving the spraying means to the site of the joint, pumping a settable anaerobic type sealant to the spraying means, causing the spraying means to spray the sealant onto the inner wall of the main to form a layer covering the joint, removing the spraying means through the hole and allowing the sealant to set.

6 Claims, 5 Drawing Sheets

METHOD OF SEALING A DISCONTINUITY WITHIN A GAS MAIN

The present invention relates to a method of sealing a discontinuity within a gas main.

By the term "discontinuity" we mean any break in continuity in a gas main, such as a joint, in particular, but also a fracture of fissure.

The joints between adjoining lengths of existing cast iron gas main can be sealed by lead and yarn. The yarn forms a packing which when wet forms a good seal as the packing expands. When gas mains carried town gas the yarn was kept moist since town gas has a high moisture content. However, following the replacement of town gas with natural gas, the yarn has tended to contract as natural gas is much drier than town gas and has tended to adsorb the moisture in the yarn. The contraction of the yarn has given rise to a tendency for the joints to leak.

It is known to treat the interior of such gas mains with yarn swelling liquid such as "Weasel" (Trade Mark) to cause the yarn to re-expand and reseal the joint.

In one such technique disclosed in UK Patent Specification No. 1362929, a hose having attached to one end a nozzle is introduced into the main through a standpipe, the nozzle having at least one rearwardly directed jet, the yarn swelling liquid is pumped to the nozzle through the hose and the liquid is caused to discharge from the jet to propel the nozzle and hose forwardly through the main. In this way the interior wall of the main is coated with the liquid some of which enters any joints contained within the length of main traversed by the nozzle.

Unfortunately the yarn swellant liquid has a tendency to evaporate after a relatively short while so that the leak re-appears and it becomes necessary to carry out the entire operation periodically to cause the yarn to re-expand.

More recently it has become commonplace to seal gas main joints internally with a settable sealant of the anaerobic type that is one which polymerises spontaneously in the absence of air. The interior of a live gas main (i.e., one carrying gas) is an ideal environment to use an aeaerobic sealant since there is no air and furthermore the polymerisation of the sealant may be accelerated by the presence of iron from which the main is usually constructed. Leaks are blocked when the gas pressure pushes the anaerobic material into the leak paths whereupon the material sets in place.

It has been found that leaking lead/yarn joints sealed anaerobically remain sealed for far longer than joints resealed by the expansion of the yarn.

In one technique for applying anaerobic sealants internally as disclosed in UK Published Patent Application No. 214053 A, an inflatable tubular pig is moved along the main to the joint, the sealants is then pumped along hoses to the pig which is inflated to force the sealant into the joint.

Unfortunately in order to permit the pig to gain access to and be removed from the main it is necessary to dig substantial excavations a either end of the main and to break out substantial sections of the main.

It is the therefore an object of the present invention to provide a technique for the internal sealing of a discontinuity in a gas main using a setable anaerobic type sealant but without the disadvantages of the above technique.

According therefore to the present invention there is provided a method of sealing a discontinuity in a gas main, the method comprising boring a hole in the wall of the main at a point spaced from the joint, inserting into the main through the hole so formed a sealant spraying means, moving the spraying means to the site of the joint, pumping a settable anaerobic type sealant to the spraying means, causing the spraying means to spray the sealant onto the inner wall of the main to form a layer covering the joint, removing the spraying means through the hole and allowing the sealant to set.

An embodiment of the invention will now be particularly described with reference to the accompanying drawings in which:

FIG. 1 shows a sealing gland in position on the gas main before the introduction of the spraying means, FIGS. 2 to 5 comprise longitudinal sections through the gland and the main showing a sequence of operations for inserting and moving the spraying means to the site of the joint.

Figure 6:
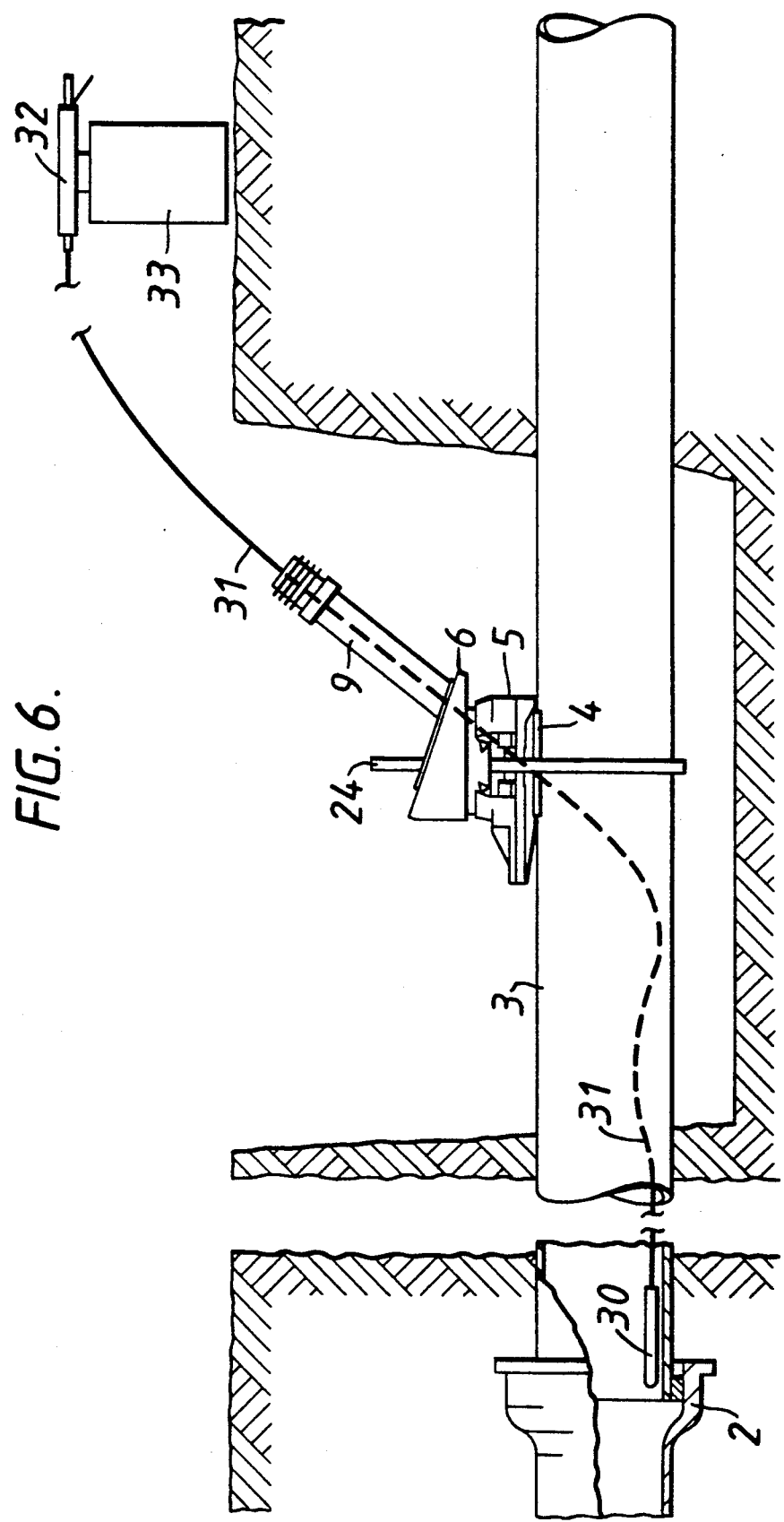

FIG. 6 inter alia shows the spraying means at the site of the joint and

Figure 7:
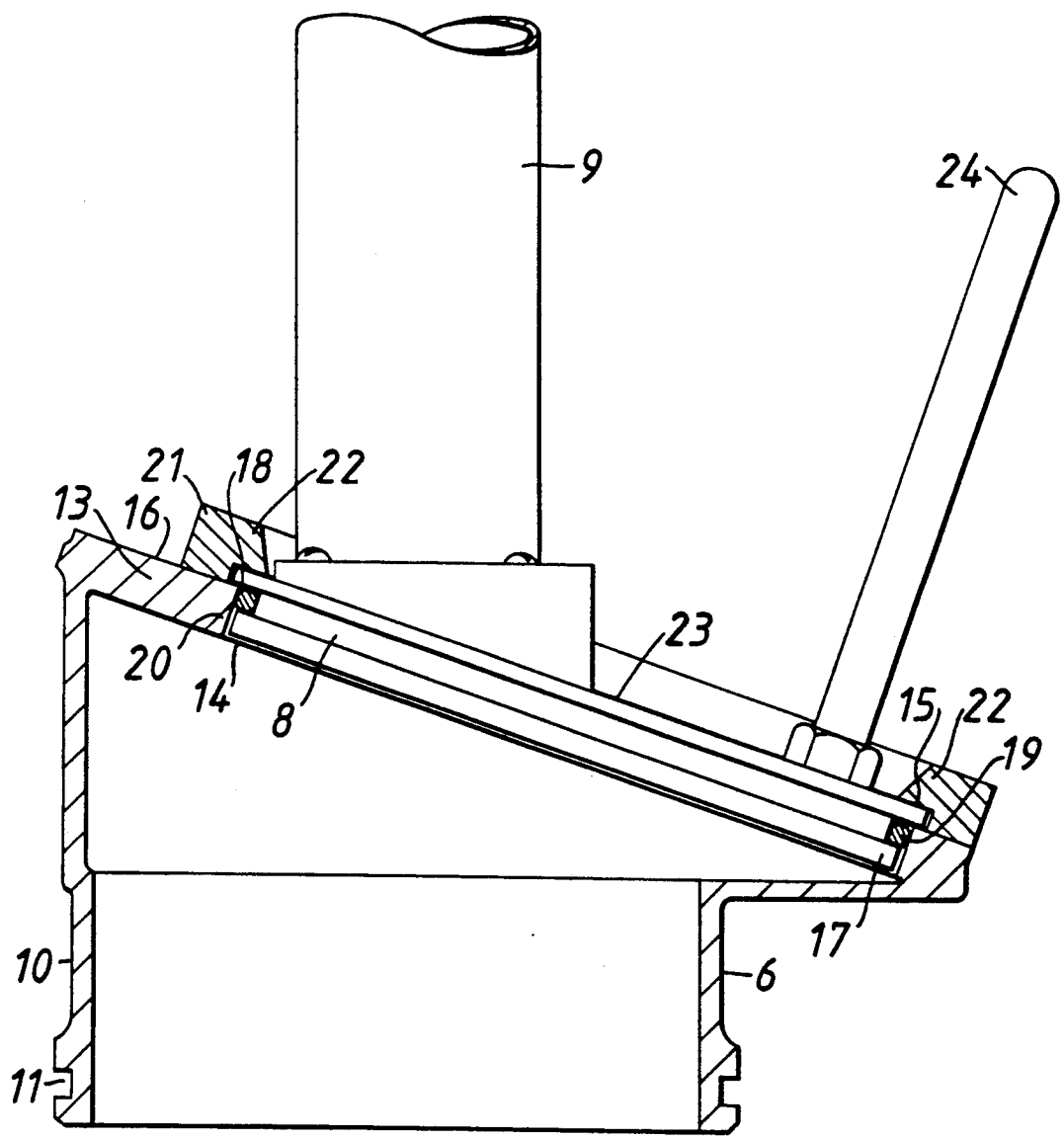

FIG. 7 shown a section through an insertion gland.

Referring to FIG. 1, in the situation shown, an excavation 1 has been dug at a point spaced from the joint 2 which it is proposed to seal so as to reveal a portion of the live gas main 3 and a hole 4 has been drilled in the wall of the main 3. There are well established techniques for drilling a hole in a live gas main.

Usually, as shown, a plate valve 5 of known construction is mounted on the main 3. A special canopy housing a hole saw is fitted to the plate valve 5 and the saw operated to cut the hole through the main. The insertion gland 6 shown in FIG. 7 is then fitted to the plate valve 5 in place of the saw canopy.

Referring to FIG. 7, the insertion gland 6 comprises a lowermost casing 7 which in use is fitted to the plate valve 5 and a rotatable plate 8 mounted on the casing and from which plate 8 there extends upwardly an insertion tube 9.

The casing 7 has a lowermost cylindrical part 10 having an externally threaded portion 11 for releasably screw fitting into the housing 12 of the plate valve 5 as shown more clearly in any of FIGS. 2 to 6.

The casing 7 has an uppermost portion 13 forming a sloping seat for supporting the plate 8 and providing an aperture 14 into the casing.

The plate 8 has an uppermost circumferential edge 15 which rests upon the uppermost surface 16 of the seat portion 13 and upon which the plate 8 can rotate. The plate 8 has a lowermost circumferential edge 17 and within a recess 18 formed between the edges 15 and 17 there is located a O-ring 19 which in use sealingly engages with the wall 20 of the aperture 14 formed by the seat portion 13. The plate 8 is secured in position by a securing ring 21 attached to the uppermost surface 16 of the seat portion, the ring 21 having an inturned circumferential portion 22 overlapping the uppermost surface 23 of the plate 8. While not shown in FIG. 7 the uppermost end of the insertion tube 9 is externally threaded to receive a sealing cap for the purposes to be subsequently described.

Figure 4:
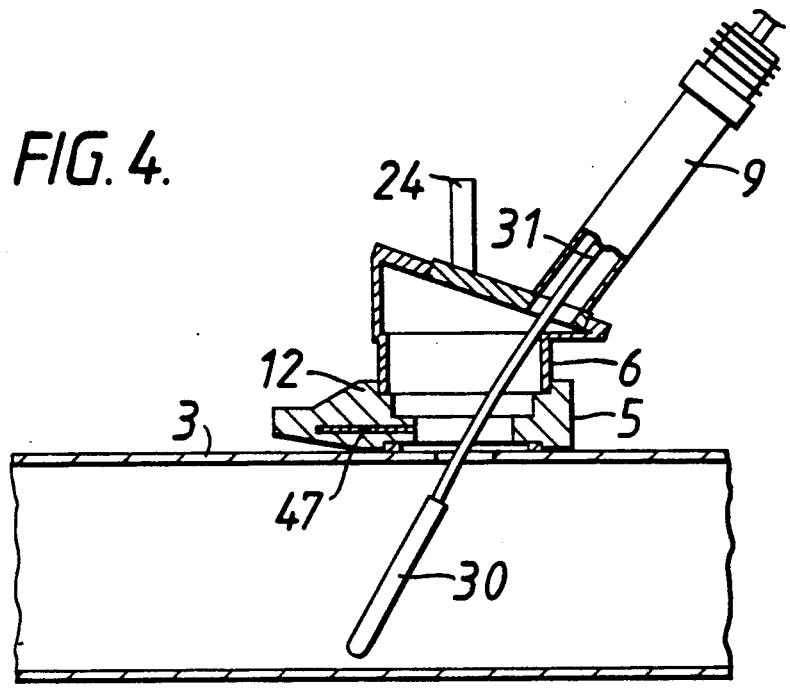
Figure 5:
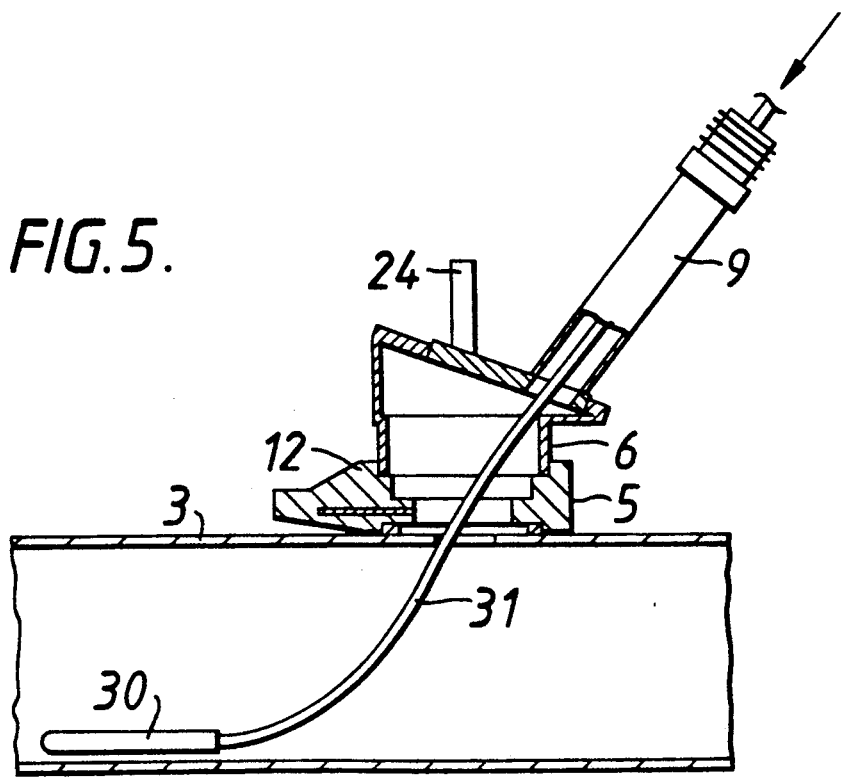

The insertion tube 9 is bolted to the uppermost surface 23 of the plate 8; the tube 9 is arranged at such an acute angle to the axis of the plate 8 that upon appropriate rotation of the plate 8 the tube 9 can take up a position as shown in FIG. 7 where the tube 9 extends vertically upward or the position shown in FIGS. 4 to 6 sloping downwardly.

Rotation of the plate 8 can be effected by means of the handle 24 bolted to the uppermost surface 23 of the plate 8.

Referring to FIG. 6 the spraying means comprises a nozzle 30 through which a sealant is sprayed onto the inner wall of the main and a flexible hose 31 to one end of which the nozzle 30 is releasably attached. The other end of the hose 31 is, in use, attached to a suitable hand pump 32 which comprises a reservoir 33 containing the sealant.

The nozzle 30 is of the well known type producing a cylindrical spray pattern of droplets.

In use, sealant pumped through the hose 31 to the nozzle 30 is emitted as streams through the nozzle 30 for impingement upon the wall of the main.

Referring to FIGS. 2 to 6, the sequence of operations is as follows. Firstly, with the nozzle 30 temporarily detached from the hose 31, the end of the hose 31 is pushed through the central aperture in a rubber gland 45 mounted in an internally threaded sealing cap 46. The nozzle 30 is then fitted onto the end of the insertion tube 9 to achieve the situation shown in FIG. 2. It will be seen that the insertion tube 9 is in its vertical position, i.e., normal to the axis of the main at this location.

Figure 2:
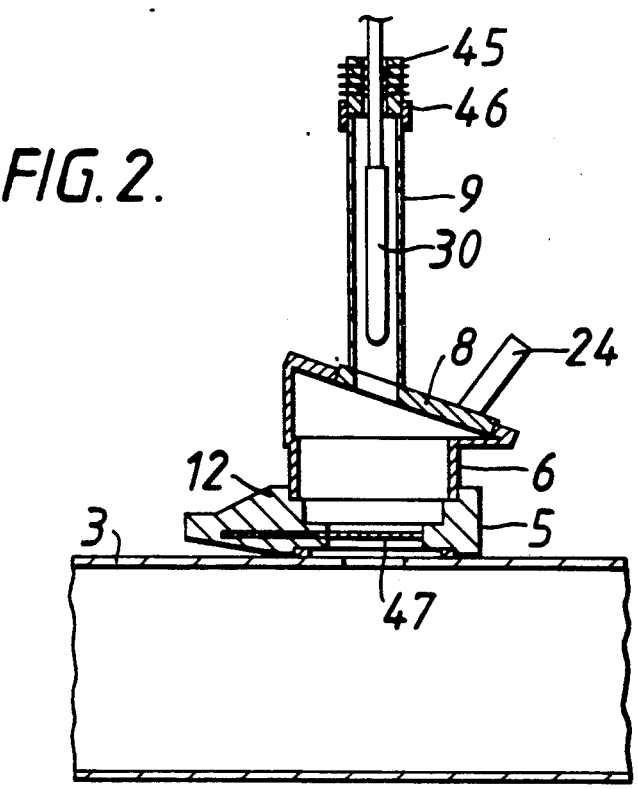
Figure 3:
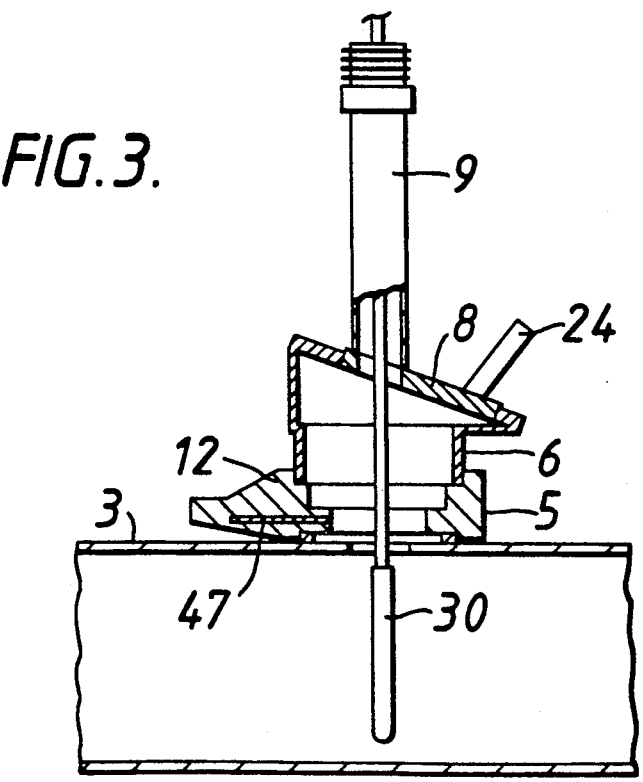

The aperture in the rubber gland 45 is so dimensioned that the gland 45 forms a seal round the hose 31. As can be seen in FIG. 2 at this stage the plate 47 in the plate valve 5 is closed to prevent the escape of gas from the main.

In the next stage of the process (FIG. 3) the plate 47 in the plate valve 5 is opened and the nozzle 30 is pushed into the interior of the main.

Following this stage, the plate 8 in the insertion gland 6 is rotated so that the insertion tube 9 is reoriented to slope downwardly in the axial direction in which it is desired to move the nozzle 30 (FIG. 4). Then the hose 31 is fed through the gland 45 so that the nozzle 30 is caused to move along the main 3 to the site of the joint 2 (FIG. 5). Once the nozzle 30 is level with the joint 2 as shown in FIG. 6 the anaerobic sealant is pumped along the hose 31 to the nozzle 30 which sprays the sealant onto the walls of the main 4 forming the joint 2 and into the joint 2 itself through any leak paths. The pressure of the gas flowing in the main 3 (from right to left as viewed) will also help to force the sealant into the joint 2. Once inside the narrow confines of the joint 2 the sealant will quickly cure (due to the absence of air) and seal of any leak paths.

The nozzle 30 may then be moved to adjoining joints 2 to effect re-sealing of these if necessary. Withdrawal of the nozzle 30 and hose 31 is the reverse of the procedure previously described.

The insertion gland 6 is then removed from the plate valve 5 after the plate 47 in the plate valve 5 has been closed. The hole in the wall of the main 3 is then plugged by conventional techniques before the plate valve 5 is removed.

In order to spray the joint effectively it is necessary accurately to fix its position. This may be done by means of a small television camera and associated cabling which may be used in conjunction with the hose and nozzle of the spraying means to identify the joint before spraying. Alternatively the camera may be used to identify the site of the joint before the nozzle and hose are inserted into the main. The camera and cable may be inserted into the main using the insertion gland and the plate valve.

An alternative method of joint location can be carried out in the following way, using a sonic transmitter and receiver. The transmitter is inserted along the inside of the pipe and the joint is found when the signal, which is received above ground over the transmitter is enhanced as the transmitter passes across the joint. The transmitter may be incorporated in the nozzle in the same way as the television camera.

While the majority of the joints in gas mains are of the lead/yarn type, there are other types of joints which have a tendency to leak from time to time and these too can be sealed by the technique described above. For instance, joints of the so called mechanical type (i.e. where the pipe ends are clamped together to form the joint and the joint is sealed with a rubber ring), screw connecting type joints, plug connection type joints and service connections can all be sealed by the technique described. Regarding mechanical type joints these tend to leak over a period of time as the rubber seal tends to relax. Although the leakage can be stopped by tightening the bolts in the clamp, this only provides a temporary seal since further relaxation of the rubber causes the leak to re-appear.

We have found that such joints can be sealed far more easily using the technique described and that such a seal is retained for a longer period than joints resealed by tightening the bolts.

I claim:

1. A method of sealing a discontinuity in a gas main carrying gas under pressure, the method comprising attaching a gland to the outer wall of the main at a point spaced from the discontinuity, boring a hole in the wall of the main by way of the gland, inserting a sealant spraying means into the main through the hole so formed by way of the gland, the sealant spraying means being inserted in a direction normal to the axis of the main at said point, reorienting said sealant spraying means in said main such that said sealant spraying means is obliquely oriented axially toward the site of the discontinuity, moving the spraying means substantially along the axis of the main to the site of the discontinuity, pumping a settable anaerobic type sealant to the spraying means, causing the spraying means to spray the sealant onto the inner wall of the main to form a layer covering the discontinuity, removing the spraying means through the hole and gland and allowing the sealant to set, the gland including means to prevent escape of gas from the pipeline both during boring of the hole and insertion and removal of the spraying means.

2. A method as claimed in claim 1 in which the spraying means comprises a nozzle through which sealant is sprayed onto the inner wall of the main and a hose to the end of which the nozzle is attached and through which sealant is pumped to the nozzle.

3. A method as claimed in claim 1 in which the settable sealant is a one component type anaerobic sealant.

4. A method as claimed in claim 1 in which after the spraying means has been removed, the gland is removed and the hole is sealed.

5. The method of claim 1 wherein the gland includes an insertion tube positionable at plural angles with respect to the axis of the main, wherein said reorienting step comprises reorienting said insertion tube relative to the axis of the main.

6. The method of claim 1, wherein said reorienting step comprises rotating said insertion tube.

* * * * *